(No Model.) 5 Sheets—Sheet 1.
J. C. ANDERSON.
METHOD OF AND APPARATUS FOR MANUFACTURING BRICK AND TILE.
No. 348,445. Patented Aug. 31, 1886.
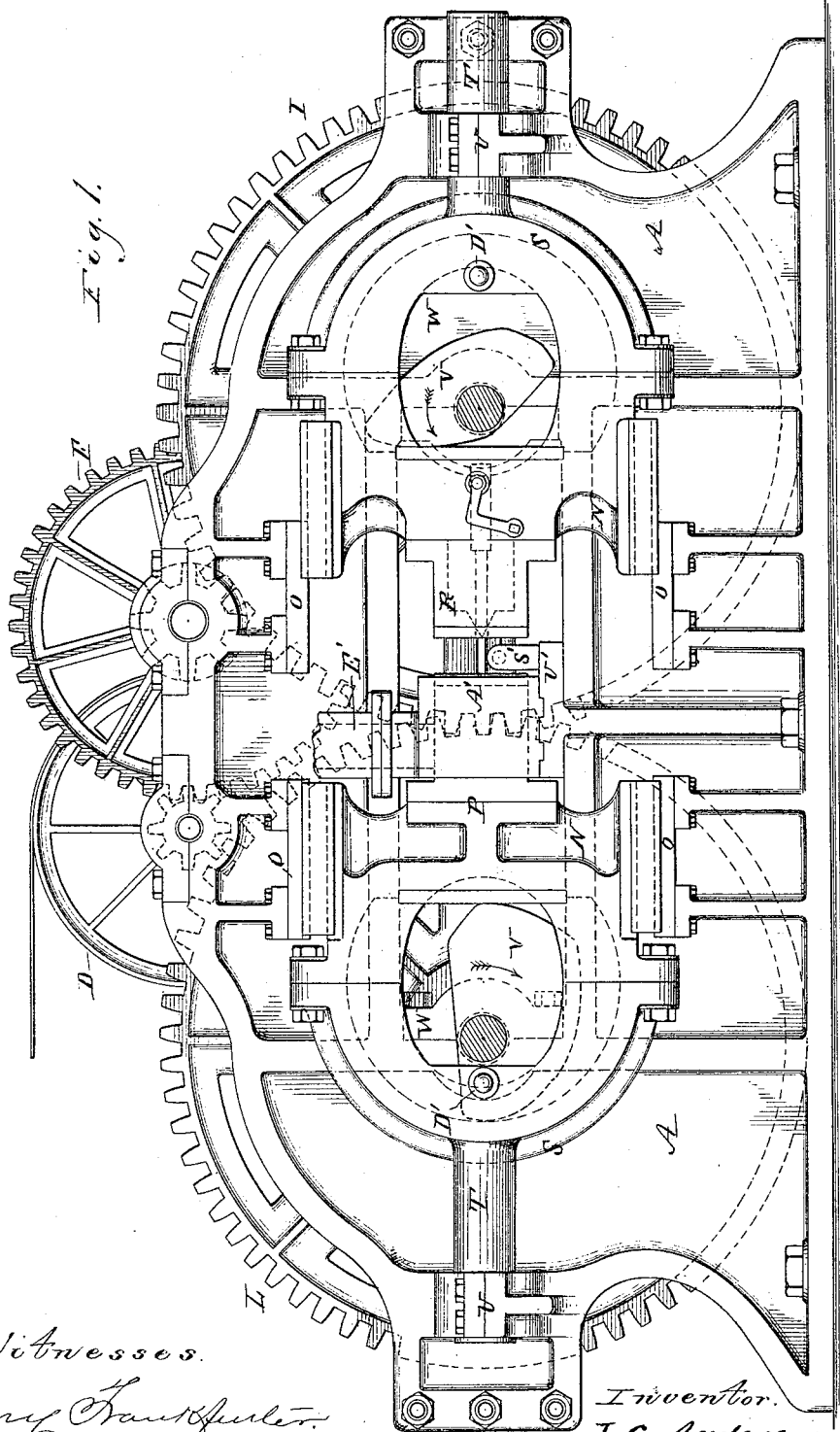
Witnesses.
Inventor.
J. C. Anderson (No Model.) 5 Sheets—Sheet 2.
J. C. ANDERSON.
METHOD OF AND APPARATUS FOR MANUFACTURING BRICK AND TILE.
No. 348,445. Patented Aug. 31, 1886.
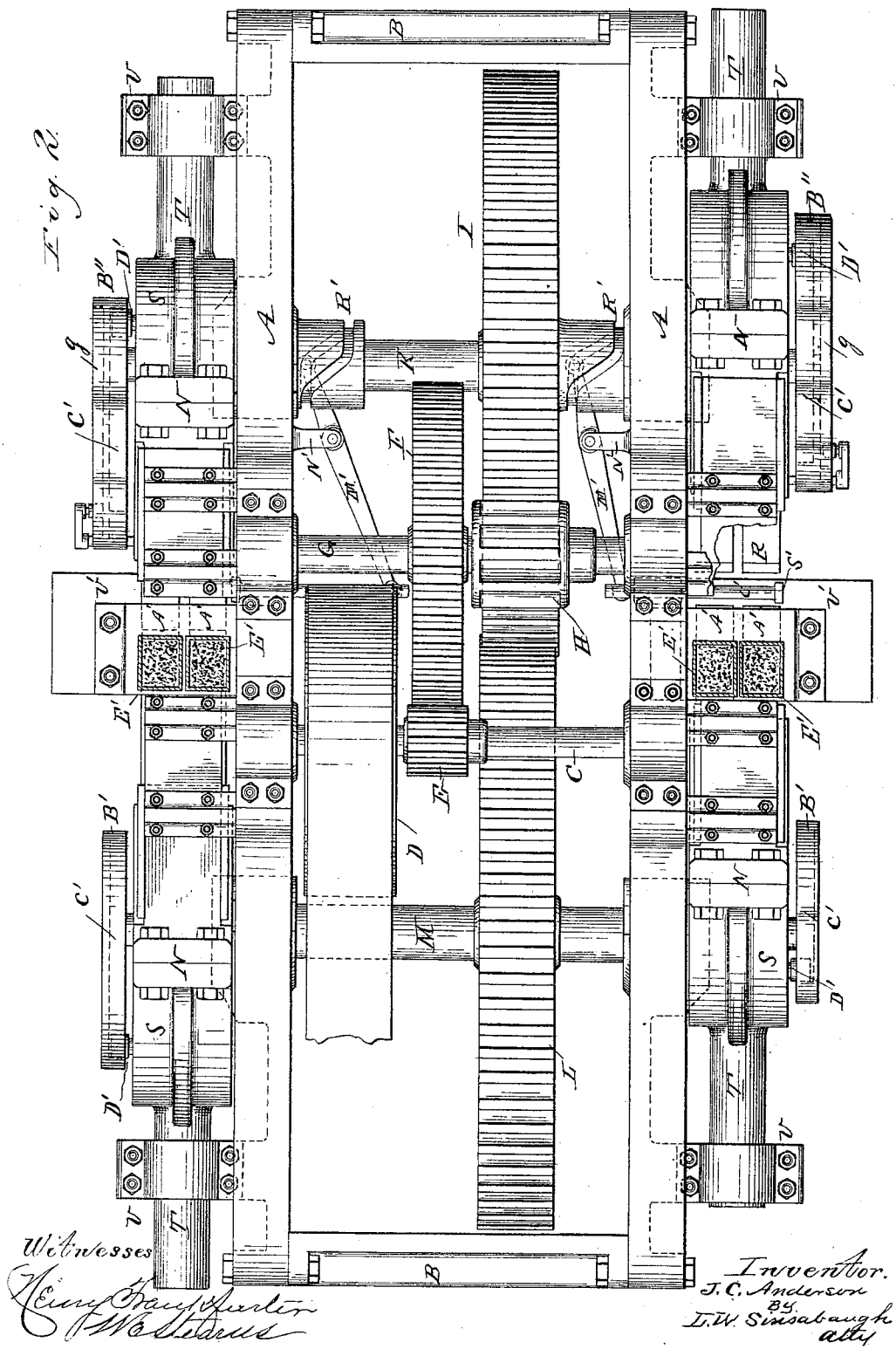

(No Model.) 5 Sheets—Sheet 3.
J. C. ANDERSON.
METHOD OF AND APPARATUS FOR MANUFACTURING BRICK AND TILE.
No. 348,445. Patented Aug. 31, 1886.
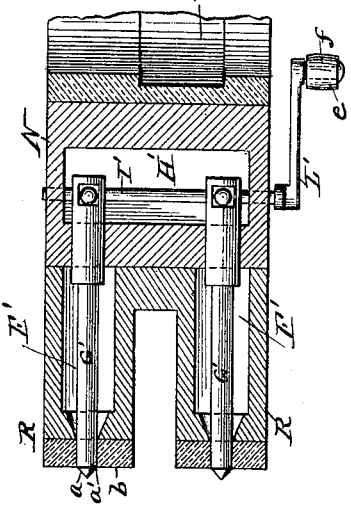
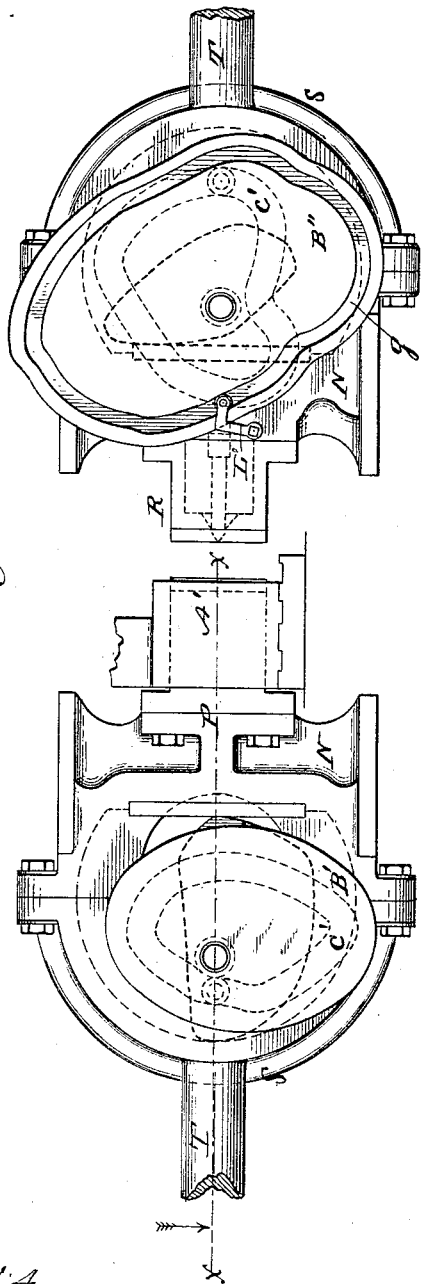
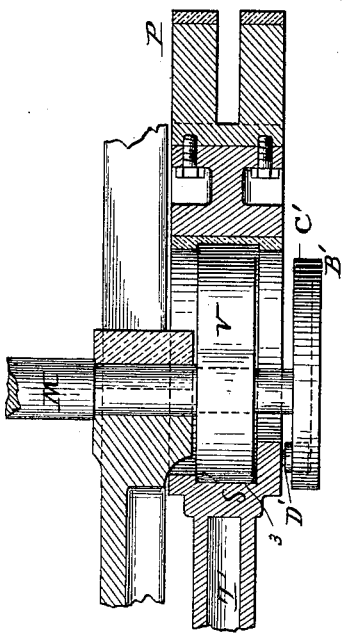
Witnesses.
Inventor.
J. C. Anderson
By
D. H. Ginsabaugh
atty.

(No Model.) 5 Sheets—Sheet 4.
J. C. ANDERSON.
METHOD OF AND APPARATUS FOR MANUFACTURING BRICK AND TILE.
No. 348,445. Patented Aug. 31, 1886.
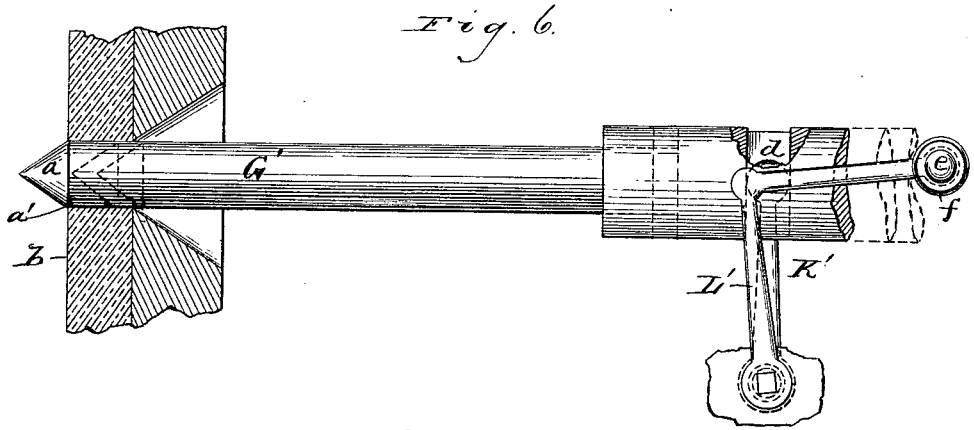
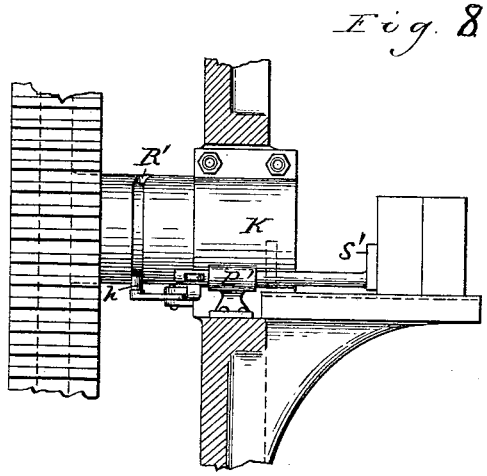
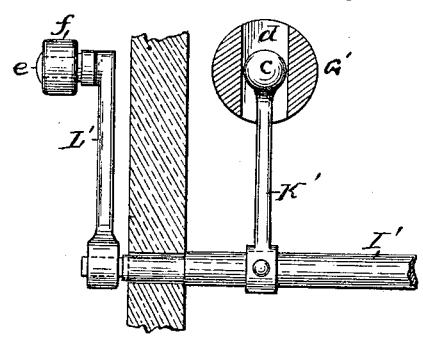
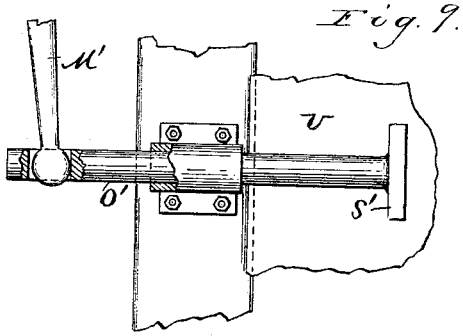
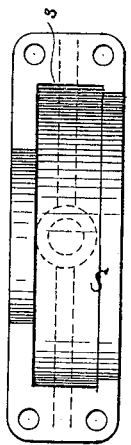
Witnesses.
Henry Frankfurter
W. E. Stearns
Inventor.
J. C. Anderson
By
L. W. Ensabaugh
atty (No Model.) 5 Sheets—Sheet 5.
J. C. ANDERSON.
METHOD OF AND APPARATUS FOR MANUFACTURING BRICK AND TILE.
No. 348,445. Patented Aug. 31, 1886.
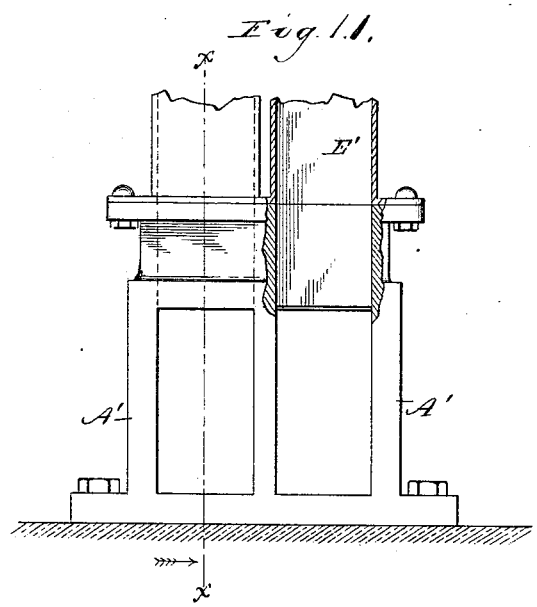
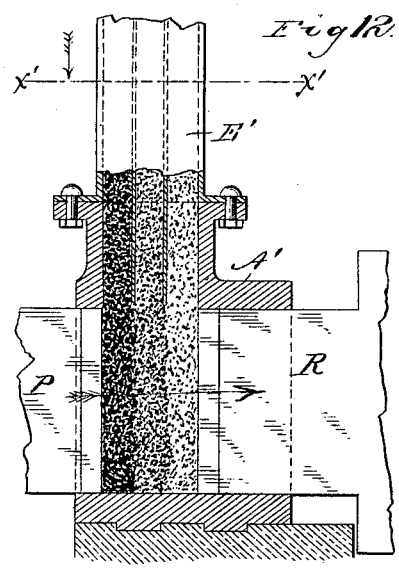
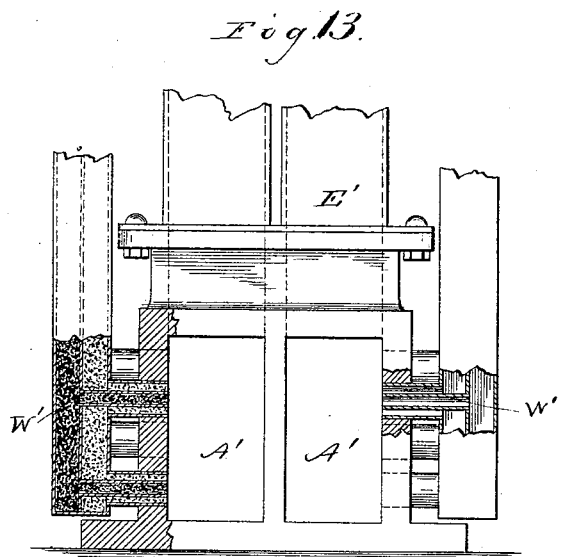
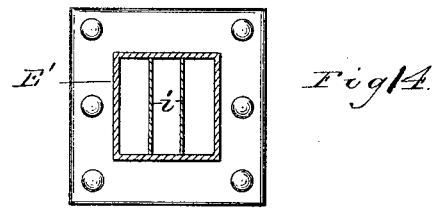
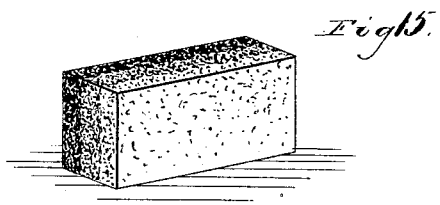
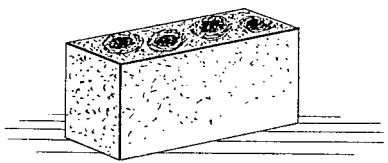
Witnesses.
Inventor.
J. C. Anderson
By
L. W. Ginsabaugh
atty.

UNITED STATES PATENT OFFICE.

JAMES C. ANDERSON, OF HIGHLAND PARK, ILLINOIS.

METHOD OF AND APPARATUS FOR MANUFACTURING BRICK AND TILE.

SPECIFICATION forming part of Letters Patent No. 348,445, dated August 31, 1886.

Application filed May 6, 1886. Serial No. 201,303. (No model.)

*To all whom it may concern:*

Be it known that I, JAMES C. ANDERSON, a citizen of the United States, residing at Highland Park, in the county of Lake, State of Illinois, have invented certain new and useful Improvements in Methods of and Apparatus for Manufacturing Brick and Tile, of which the following is a specification, reference being had therein to the accompanying drawings.

My invention relates to improvements in brick and tile machines, and particularly to that class known as "dry-clay" machines, in which the clay is pressed into form while in a dry and finely divided or powdered condition.

The object of my invention is to construct a machine which will be comparatively simple in its parts and effective in its operation.

My invention consists of a brick or tile machine in which the compression-plungers work in a horizontal direction, one set on each side of the machine, said plungers being so timed that their periods of compression occur alternately.

My invention consists, further, in making the mold-box somewhat longer than the width or thickness of the brick or tile, and in forming in a portion of said mold-box an opening which communicates with the feed-spout, said opening being opened and closed by the movement of one of the plungers whereby the clay is fed into the mold by gravity and suction, thus excluding in a great measure the external air.

My invention consists, further, in the method of feeding clay of different colors into the molds, so that bricks having different colors and various styles of decoration can be produced.

My invention consists, further, in an automatic device for operating the air valve or plug, whereby the mold is relieved of the compressed air before the pressure is withdrawn from the brick, thereby preventing the articles from being checked or cracked by the force of the compressed air within the body of clay, and also to prevent a suction-vacuum caused in withdrawing the die from the mold.

My invention consists, further, in operating the plungers to compress the material into form by means of jib cams and in the reverse direction by means of grooved cams.

My invention consists, further, in automatic devices for moving the brick sidewise from between the plungers, so that they can be readily removed by the operator.

Other novel and important features will be fully described hereinafter, and pointed out in the claims.

Referring to the drawings, Figure 1 is a side elevation of my improved machine. Fig. 2 is a top or plan view of the same. Fig. 3 is a side view of both plungers, with the cams for operating the same. Fig. 4 is a longitudinal sectional view of one set of plungers with the cams for operating the same, taken on the line *x x* of Fig. 3. Fig. 5 is a sectional view of the other set of plungers with the mechanism for operating the air plugs or pins. Fig. 6 is a side view of one of the air plugs or pins, and levers for operating the same. Fig. 7 is a front view of the levers for operating the air plugs or pins, and a sectional view showing the connection of the lever with said pin. Fig. 8 is a front view of the devices for pushing the brick or tile away from the mouth of the mold and the cam-groove for operating the same. Fig. 9 is a top or plan view of a portion of Fig. 8. Fig. 10 is an end view of one of the housings for the operating-cams. Fig. 11 is an end view of the molds with the mold-filling spouts. Fig. 12 is a sectional view of one of the molds, with the plungers therein and the clay-feeding spouts adapted to deposit clays of different kinds, taken on the line *x x* of Fig. 11. Fig. 13 is a front view of the molds showing a modification of the devices for feeding clay of different kinds into the mold, so as to produce rings or spots of different colors. Fig. 14 is a sectional plan view of the feed-spout, taken on the line *x' x'* of Fig. 12. Fig. 15 is a view in perspective of a brick having three layers of clay of different colors, such being formed by the feed-spouts shown in Fig. 12. Fig. 16 is a similar view of a brick having rings and spots of different colors, such being formed by the feed-spouts shown in Fig. 13.

A indicates the sides of the machine, which are cast in one piece and connected together at the ends by suitable cross ties or bars, B, so as to form a rigid and substantial structure. The sides of the machine are each cast with suitable lugs, projections, or brackets, which support the plungers and molds, as will more fully appear hereinafter.

C is a shaft mounted in suitable bearings in the sides of the machine, said shaft being provided with a band-wheel, D, by which power is communicated to the machine, and also with a pinion-wheel, E, which meshes with the pinion or spur wheel F. The spur-wheel F is mounted on the shaft G, which is also mounted in suitable bearings in the sides A of the machine, said shaft being provided with a pinion-wheel, F, which meshes with the large spur-wheel I, mounted on the shaft K. The spur-wheel I meshes with and imparts motion to the spur-wheel L on the shaft M. The shafts K and M project through the sides of the frame and carry the cams which operate the plungers, as will more fully appear hereinafter.

N are blocks or cross-heads, adapted to slide back and forth on the ways O, secured to the sides of the machine.

P and R are the compression-plungers secured to one side of the cross-heads, while to the other side of the cross-heads are bolted the steel yokes or castings S, the rear side of said yokes or castings being provided with extensions T, which are seated in the bearings U, and thus form a rear support and guide for the plunger-carrying frames or cross-heads. As before intimated, the yokes or cross-heads S are cast in two parts, and provided with flanges, to receive the screws for holding the parts together, and a strengthening-rib, 2, to give the requisite strength within the proper limits of space.

V are eccentric disks or cams secured to each end of the shafts K and M, outside of the frame A, said cams being adapted to work in the recesses W in the plunger-carrying frames, yokes, or cross-heads S, whereby the plungers are moved forward to compress the clay within the molds A'. The yokes or cross-heads S are provided with grooves 3, in which the eccentric-disks V work, said grooves being somewhat larger than the recesses W, so as to form an oil-reservoir to hold the lubricating compound, so that when the cams or eccentric-disks sweep through the lubricant at each revolution they will be automatically lubricated. This is an important feature of my invention, for the reason that the great pressure and friction of the eccentric-cams on the inside of the yokes make it necessary to oil the parts frequently, whereas by the devices just described it is only necessary to fill the groove with oil, no further attention being necessary until the oil has become exhausted.

B' B" are eccentric disks or plates secured to the outer ends of the shafts M K, respectively, said disks being provided on their inner faces with cam-grooves C', which engage with studs or projections D' on the plunger-carrying frames, and by which means the plungers are drawn back after the plungers have been moved toward each other and the clay has been pressed. The molds A' are made larger than the size required for the brick or tile to be formed therein, and the rear portions of said molds are made with openings which communicate with the clay or feed-spouts E', and through which the clay is fed into the molds. The operating-cams V on the shaft M are of such configuration that the plungers P are thrust forward to meet the thrust of the plungers R, to form or compress the brick, and are then pushed forward to eject the brick from the mold. The cam-grooves C' in the disks or cams B' are so constructed that the plungers P are drawn back past the openings in the mold-boxes, while the plungers R are in the front end of the mold-boxes, as shown in Fig. 12, so that the clay in the spouts E' will be drawn into the molds by suction and gravity combined. During this period of backward movement of the plungers P the plungers R are moved forward into the mold-box A', by means of the cam-grooves C' on the cam B", as shown in Fig. 12, so as to regulate the charge of clay. After the charge of clay has been deposited in the mold, both plungers are moved in the same direction, as indicated by the arrow in Fig. 12, until the plungers R are near the front end of the mold, when the rearward movement is arrested, and the cam V on the shaft K operates to move the plungers forward to compress the clay. The plungers P at this time serve to cut off the supply of clay from the spouts E' until they have returned in their rearward movement past the openings in the mold-boxes, when said boxes are again filled with clay. In this instance, as has already been stated, the clay-spouts are above the molds, so that the proper amount of clay is fed into the same by gravity and the vacuum produced by the rearward movement of the plungers P, as already indicated. The plungers R are provided with longitudinal cavities F', in which are located the pins or plugs G'. The front ends of these pins or plugs are made tapering, as shown at a, and project through openings a', formed in the face-plates b of the plungers. The rear ends of the pins G' project into the transverse cavity H', formed in the cross-heads H, and are connected to the bar I' by means of the arms K', the upper ends of said arms being provided with balls c, which enter openings d', formed in the rear ends of the pins G'. The bar I' is mounted in bearings in the walls of the cavity H', one end of which projects through the same and is connected to one end of the bell-crank lever L', the free end of said lever being provided with a stud, e, and friction-roller f, which projects inward and connects with the cam-groove g, formed in the outer face of the cam plate or disk B'. The function of the devices just described is to free the molds of air which has been compressed with the clay, and the operation of the same is as follows: The cam-groove g acts on the bell-crank lever L' to withdraw the same from the brick about an inch and a quarter to open the air ducts or openings $a'$ about the time the plungers R recede, for expelling the atmospheric air which has been compressed in forming the brick, or at that point when the brick has been compressed to within about three-sixteenths of an inch of its ultimate thickness. The plugs or pins are held by the action of the cam $g$ on the bell-crank lever L' until the plungers R are entirely withdrawn from the molds or die-boxes and until said plungers have again reached a point in their upward movement in close proximity to the plungers P, when said plugs are thrust forward about a quarter of an inch, so as to close the openings or air-ducts $a'$ at a point where the faces of the two plungers meet, so that no air may be admitted into the cavity between the plungers as the plungers P are moved away from the plungers R, so as to produce a vacuum and open the parts to the clay-spouts to allow the clay to rush in and fill the space between the plungers, as shown in Fig. 12. When this operation is completed, and just before the pressing operation begins, the plugs or pins G' are thrust out to their full throw, and held in that position until the clay is well compacted, or to the point stated, when they are withdrawn from the nearly-completed brick, the clay having been then well enough compacted to maintain the solidity of the brick, at the point from whence the cone-points of the plugs have been withdrawn, and the clay, which would have rushed out at such an opening from the molds before the pressure, will remain fixed as a part of the brick. By the devices and method of operating the same as just described the air is allowed to escape, and the plungers R can be readily withdrawn without checking or cracking the brick.

I will now proceed to describe the devices by which the brick are pushed over from the face of the mold, so they can be readily removed by the hand of the operator. M' is a lever pivoted to a bracket, N', as shown in Fig. 2, one end of said lever being pivoted to the sliding bar O', which is adapted to slide back and forth in the guide P'. The other end of the lever M' is provided with a pin and friction-wheel, $h$, adapted to engage in the cam-groove R', formed in the shaft K', and by which means the head or enlarged portion S' is brought in contact with the newly-formed brick, which have been ejected from the mold onto the table or platform V', and push the same away from the path of the plungers R. After the bricks have been pushed away from the mouth of the molds, the bar O' is quickly drawn back out of the way of the plungers R by an abrupt angle in the cam-groove R'.

In an application filed by me January 20, 1886, Serial No. 189,174, I have claimed, broadly, the method of feeding the clay to the molds by producing a vacuum between the plungers and drawing in the powdered clay between the same, and such I do not claim in this application.

In an application filed by me November 20, 1885, Serial No. 183,430, I have shown, described, and claimed a brick made up of clays having different colors, so as to represent striped onyx, and, in order to produce them rapidly and with a certain degree of uniformity, I employ the feed-spouts which I will now describe. For producing the striped brick referred to, the feed-spouts shown in Figs. 12 and 14 are divided into any desired number of compartments by the plates or partitions $i$, said compartments being filled with clay powder which will burn the different colors desired. In the example shown in Fig. 15 three different-colored clays are used; but it is obvious that any desired number can be used by increasing the number of partitions or compartments in the feed-spouts. Another illustration of manufacturing ornamental bricks is given in Fig. 13, in which the separate clay-spouts extend down along the side of the mold-box and communicate with the same by a series of circular tubes, W'. These tubes may be single and used in connection with the upper or vertical spouts, E', for making a plain spot on the face edge of the brick, as in the case of producing an imitation of blood-stone, or numerous concentric rings may be formed on the brick by placing a series of larger pipes over smaller ones, or, instead of round pipes, they may be contorted so as to represent any desired figure or any number of veins of different colors running along the face of the brick, it being understood that the different tubes communicate with different clay-spouts or with spouts containing clay of different colors. By this method of supplying the clay to the molds I am enabled to produce brick having any desired style of ornamentation with clays of different colors, which, when pressed into form, will produce articles that are solid and homogeneous in their texture.

Having thus described my invention, what I claim is—

1. The method herein described of making ornamental brick or tiles of clays of different colors, the same consisting in reducing the same to a finely-divided condition and conducting it to the molds through a plurality of spouts, as set forth.

2. The method herein described of ornamenting the face of bricks or tiles with clays of different colors, the same consisting in feeding the clay through a plurality of spouts in the face edge of the mold, in connection with the spouts for filling in the clay, forming the main body of the brick or tile, as set forth.

3. In a brick and tile machine, the plungers P and R, located on the outside of the machine and adapted to work in a horizontal direction, as described, whereby the clay is fed into the side of the mold-box by the combined action of suction and gravity, as set forth.

4. In a brick and tile machine of the character described, the plungers of which are moved toward each other to compress the clay by means of eccentric cams, as described, and moved in an opposite direction by means of cam-slots engaging with studs or pins on the plunger-frames, as set forth.

5. In a brick or tile machine of the character described, the cams V, adapted to work in the grooves 3, formed in the walls of the open space n of the yoke or cross-head S, in combination with the cam-grooved disks located outside of the plunger-frames and connected thereto by means of a stud working in said cam-groove, as set forth.

6. In a brick and tile machine of the character described, the horizontal mold-boxes A′, connected to and communicating with the feed-spouts at one end thereof, whereby the clay is fed into said molds by gravitation, as set forth.

7. In a brick and tile machine of the character described, the horizontal mold-boxes A′, connected to and communicating with the feed-spouts at one end thereof, in combination with the horizontally-reciprocating plungers, operated as described, whereby the supply of clay is fed into the mold-box and moved forward to the solid portion of the mold before compression takes place and an excess of air prevented from entering the molds, as set forth.

8. In a brick-machine of the character described, the bar O′, provided with the head S′, in combination with the pivoted lever M′ and cam-groove R′, whereby the nearly-formed brick are pushed out of the path of the plungers, as set forth.

9. In a brick-machine of the character described, the pins or plugs G′, connected to the shaft I′, as described, said shaft being provided with a bell-crank lever, L′, and friction-stud c f, in combination with the disks B″, provided with the cam-slot g, whereby the pins or plugs are moved back and forth at the proper time to allow the compressed air in the molds to escape, as set forth.

10. In a brick-machine of the character described, the cross-heads N, carrying the plungers P and R, adapted to travel on guides O, in combination with the portions S, provided with the extensions T, adapted to work in the guides U, as set forth.

11. In a brick-machine of the character described, the yokes S, provided with the oil-receiving groove 3, as and for the purpose set forth.

In testimony whereof I affix my signature in presence of two witnesses.

J. C. ANDERSON.

Witnesses:
HIRAM SINSABAUGH,
MILTON LINDLEY.